US011533253B2

(12) United States Patent
Cui et al.

(10) Patent No.: US 11,533,253 B2
(45) Date of Patent: Dec. 20, 2022

(54) CONNECTIONLESS SEGMENT ROUTING FOR 5G OR OTHER NEXT GENERATION NETWORK

(71) Applicant: AT&T Intellectual Property I, L.P., Atlanta, GA (US)

(72) Inventors: Zhi Cui, Sugar Hill, GA (US); Paul Smith, Jr., Heath, TX (US); Farooq Bari, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 4 days.

(21) Appl. No.: 16/262,441

(22) Filed: Jan. 30, 2019

(65) Prior Publication Data
US 2020/0244573 A1 Jul. 30, 2020

(51) Int. Cl.
*H04L 45/00* (2022.01)
*H04W 28/02* (2009.01)

(52) U.S. Cl.
CPC .............. *H04L 45/34* (2013.01); *H04L 45/70* (2013.01); *H04W 28/0247* (2013.01)

(58) Field of Classification Search
CPC ..... H04L 45/34; H04L 45/70; H04W 28/0247
See application file for complete search history.

(56) References Cited

U.S. PATENT DOCUMENTS

| | | | |
|---|---|---|---|
| 6,628,617 B1 * | 9/2003 | Karol | ............ H04L 12/66 370/395.5 |
| 9,686,181 B2 | 6/2017 | Akiya et al. | |
| 10,110,495 B1 | 10/2018 | Sabella et al. | |
| 10,111,127 B2 | 10/2018 | Cui et al. | |
| 10,148,561 B2 | 12/2018 | Cui et al. | |
| 2013/0088964 A1 * | 4/2013 | Towster | ............... H04L 47/125 370/235 |
| 2017/0257289 A1 | 9/2017 | Cui et al. | |
| 2017/0366605 A1 | 12/2017 | Chang et al. | |
| 2018/0063018 A1 | 3/2018 | Bosch et al. | |
| 2018/0176143 A1 | 6/2018 | Cui et al. | |
| 2018/0176886 A1 | 6/2018 | Kodaypak et al. | |
| 2018/0288179 A1 | 10/2018 | Bhatia et al. | |
| 2018/0295057 A1 | 10/2018 | Cui et al. | |
| 2018/0337862 A1 * | 11/2018 | Sharma | ............... H04L 43/0829 |

(Continued)

FOREIGN PATENT DOCUMENTS

WO   WO-2020060537 A1 *   3/2020   ........... G06F 21/552

OTHER PUBLICATIONS

Lee, Suk Kyu, et al. "Future of IoT Networks: A Survey." Appl. Sci. 2017, 7, 1072; doi:10.3390/app7101072. 25 pages.

*Primary Examiner* — Zhensheng Zhang
(74) *Attorney, Agent, or Firm* — Amin, Turocy & Watson, LLP

(57) ABSTRACT

Unlike smart devices, Internet of things (IoTs), such as meter readers, generate very low revenue per user. Traditional tunnel/bearer based connection-oriented architectures do not scale economically for billions of IoT devices due to the amount of signaling overhead associated with GTP tunnel setup/tear down and the states related to GTP tunnels maintained at various parts of the mobile network. However, the mobility network can efficiently support massive stationary and/or mobile IoTs by reducing the amount of signaling overhead, the state of the IoTs kept in network, and simplifying the data plane when possible.

20 Claims, 10 Drawing Sheets

(56) References Cited

U.S. PATENT DOCUMENTS

2019/0166016 A1\* 5/2019 Livanos ................. H04L 67/322
2019/0166032 A1\* 5/2019 Inbaraj ................... H04L 43/14
2020/0028758 A1\* 1/2020 Tollet ................... H04L 41/5041

\* cited by examiner

CONNECTIONLESS SEGMENT ROUTING FOR 5G OR OTHER NEXT GENERATION NETWORK

TECHNICAL FIELD

This disclosure relates generally to facilitating connectionless segment routing. For example, this disclosure relates to facilitating connectionless segment routing for internet-of-things (IoT) for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating connectionless segment routing is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
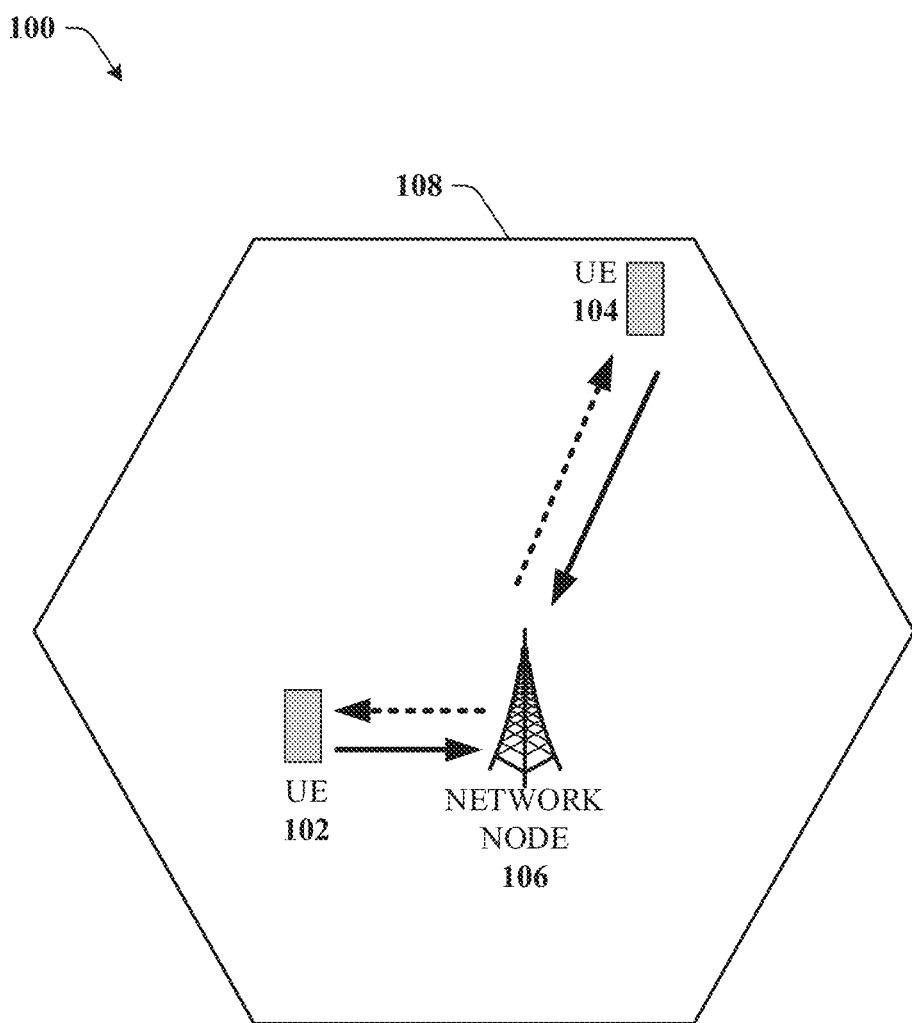
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate connectionless segment routing for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate connectionless segment routing for a 5G network. Facilitating connectionless segment routing for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

To efficiently support the billions IoT devices, instead of a connection-oriented architecture that sets up a general packet radio service tunneling protocol (GTP) before any data path communications, a connectionless architecture can use software-defined networking (SDN) principles combined with IP-based direct user data packet forwarding. SDN can be used as a control plane protocol for packet forwarding configurations, and for flexible service edge configurations (e.g., via a segment routing header (SRH) configuration). Techniques such as segment routing (SRv6) can be used for user the plane to deliver the packets, and to allow flexible service edge treatment, service chaining, (e.g., such as billing), traffic engineering (TE), etc. This architecture provides simpler and scalable wireless management for stationary IoTs. Additionally, the architecture can provide significant signaling reduction and state reduction due to the omission of GTP tunnels, especially with an aggregated/shared packet forwarding treatment and table look-up for similar IoT devices (e.g., shared forwarding rule and look up entry for water meters destined to the same water company). The connectionless system can also be used for nomadic and "sitting" devices. This architecture can use IP protocol instead of 3GPP specific GTP tunnels, thereby simplifying adaption of new Radio Access Technologies (RAT).

Integrated central unit user plane (CU-UP) and user plan functionality (UPF) at the mobility edge for the traffic exiting the mobility service can eliminate the GTP tunnel naturally. In another deployment scenario, the CU-UP is more distributed in the RAN and the UPF is placed within the core network. In this case, eliminating of the GTP tunnel and replacement by a connectionless architecture is very important. Within a 5G core network, multiple UPFs can be concatenated (e.g., UPF1, UFP2, UPF3) to build the UPF for the 5G core. At the mobile edge, the CU-UP can be integrated with UPF1, wherein the UPF2 and UPF3 are more centralized in the core network. In another scenario, within a 5G network, different slices can be used to accommodate the needs of a variety of types of devices, services and applications with dramatically different service delivery and mobility requirements (e.g., use different network slices for connectionless vs. connection-oriented architecture).

To efficiently support the IoT devices, the connectionless architecture can provide a simple and scalable solution for massive stationary IoTs. For a given massive IoT service or a group of services, (e.g., electric meter readers), an SDN controller can dynamically configure one or more of the network element(s) as the service edges (SEs). Any layer 4 or above routers in the network can be a service edge since deep packet inspections (DPI) are based on the IP and transport layer information. The SDN controller can also configure the service function chaining at the SE for a given service flow to receive appropriate service treatment required, (e.g., lawful intercept, etc.) based on the business and service requirements. The SDN controller can also dynamically configure the service entry point to add a SRH (SRv6 header), which can contain the routing and service chaining vector information (i.e., the sequence of the routers/service nodes, and virtual network functions (VNFs)) to the packets coming from the massive IoT devices.

The service entry point can also indicate how the packet should be routed in the network based on certain criteria (e.g., destination address (DA)=Electric Co.). By using the SRH (e.g., open flow (OF) 2, OFk, OF3 (microservice (MS)1, MS2), a GTP tunnel nor any explicit connection-oriented signaling for each IoT device is required. In addition, the SDN controller can dynamically collect network resource utilization information (e.g., computers, storage, networks, etc.) physically and/or virtually, at each network and service node/element and decide the optimal routing and service chaining vector and provide the updated routing SRH at the service entry point at any time. Furthermore, a single table entry can be shared by all the electric meter readers. This can significantly reduce the amount of signaling and reduce the state information in the network. The intermediate route can then forward the packet based on the routing information in the tag. The packets can traverse through the network and receive the subscribed service treatment (e.g., parental control functions, lawful intercept of data, etc.) at the SE based on the SRH added onto the packets. Depending on servicing needs, service treatment functions can be distributed more closely to the customer or at a centrally located place.

The SE at the exit of the mobile network can remove the SRH and forward the packets to the data network and onward to the application provider (e.g., the electric company). This architecture provides simpler and scalable service delivery for stationary IoTs by significantly reducing signaling and states due to the omission of GTP tunnels, especially with the aggregated/shared forwarding treatment and table look up for similar IoT devices. For example, the architecture allows shared forwarding rules and look up entries for thousands of electric meters destined to the same electric company.

In one embodiment, described herein is a method comprising configuring, by a software-defined networking device comprising a processor, a service edge device associated with an internet-of-things device of a wireless network. The method can comprise receiving, by the software-defined networking device, network resource utilization data representative of a network resource utilization. Additionally, based on the network resource utilization data, the method can comprise configuring, by the software-defined networking device, a service entry point device of the wireless network to associate packet headers with packets of the wireless network.

According to another embodiment, a system can facilitate, configuring a service edge device, associated with an internet-of-things of a wireless network, to receive packet data associated with a packet of the wireless network. The system can comprise receiving network resource utilization data representative of a network resource utilization associated with the wireless network. Furthermore, in response to the receiving the network resource utilization data, the system can comprise configuring a service entry point device of the wireless network to associated a packet header with the packet of the wireless network.

According to yet another embodiment, described herein is a machine-readable storage medium that can perform the operations comprising configuring a service edge device, associated with an internet-of-things of a wireless network, to receive packet data. The machine-readable medium can perform the operations comprising receiving network resource utilization data representative of a network resource utilization associated with the wireless network. Additionally, based on the receiving the network resource utilization data, the machine-readable medium can perform the operations comprising generating a packet routing data structure usable to route packets of the wireless network to a destination address within the wireless network.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
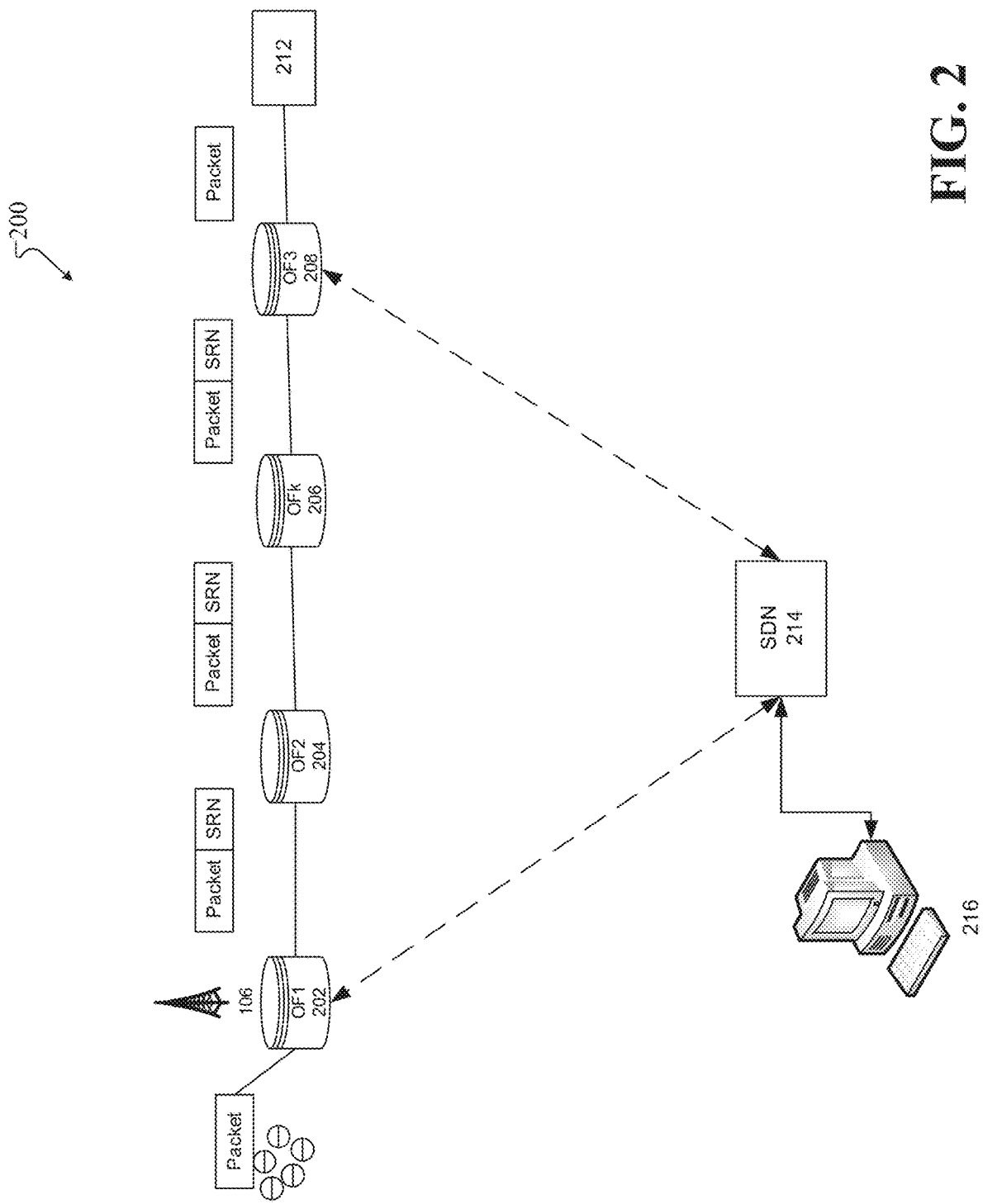
FIG. 2 illustrates an example schematic system block diagram of a system architecture for connectionless segment routing according to one or more embodiments.
Figure 3:
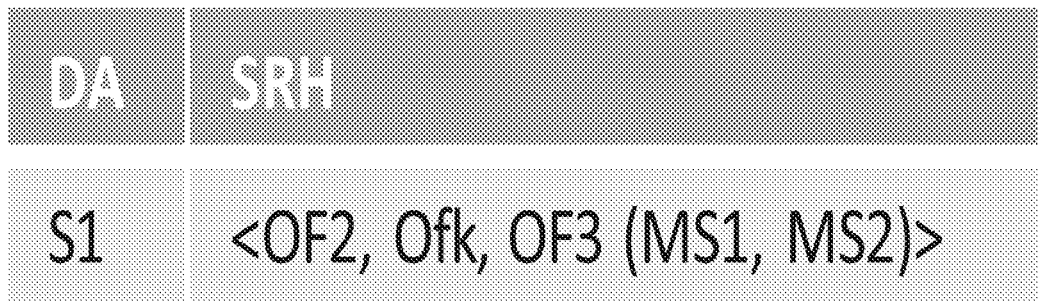
FIG. 3 illustrates an example table for connectionless segment routing according to one or more embodiments.
Figure 4:
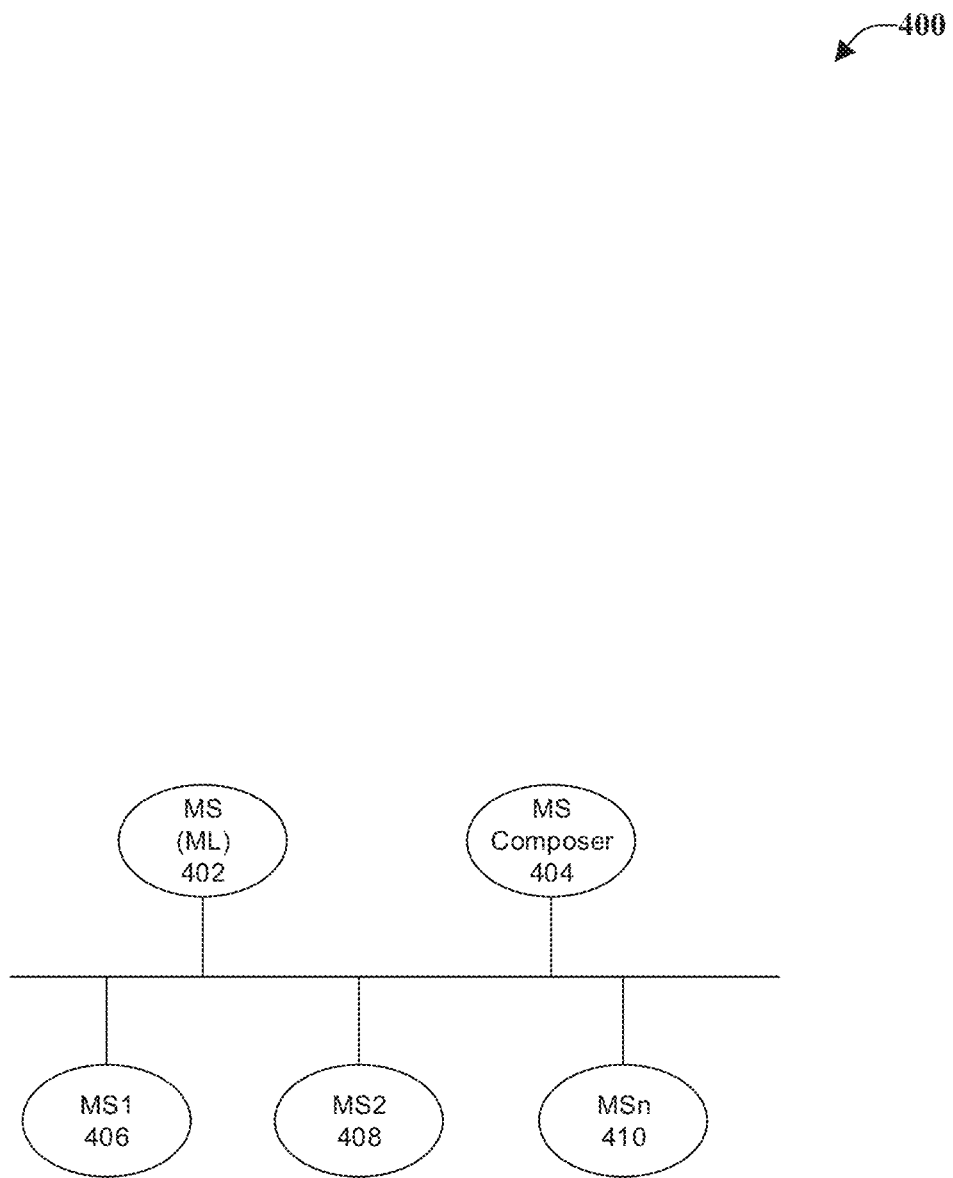
FIG. 4 illustrates an example schematic system block diagram of microservices for connections segment routing according to one or more embodiments.

Referring now to FIG. 2 and FIG. 3, illustrated is an example schematic system block diagram of a system architecture 200 for connectionless segment routing according to one or more embodiments and an example table for connectionless segment routing according to one or more embodiments. An SDN controller 214 can dynamically configure one ore more network elements 202, 204, 206, 208 (e.g., OF1, OF2, OF3, etc.) at the service edge. The network elements 202, 204, 206, 208 can comprise various functions (e.g., security, QoS, charging, byte counting, etc.) at the edge and therefore comprise different microservices as depicted in FIG. 4. The SDN controller 214 can next configure a forwarding table (as depicted in FIG. 3), with header information, at the service entry point, wherein the service entry point can be a gNodeB (network node 106) within the RAN. Therefore, the SDN controller 214 can configure the routing information and/or the service chain information to determine how to route data packets. Consequently, as shown in the table in FIG. 3, the network can place a header (e.g., OF1, OFk OF3) on any packet that is headed to the destination "S1". Additionally, although there can be many microservices, as depicted in FIG. 4, provided via OF3, the table can determine which microservices are selected for use. Thus, in this case, MS1 and MS2 can be used at network element 206 (e.g., OF3). When the packet enters the network via the gNodeB (e.g., network node 106), the gNodeB (e.g., network node 106) can then place the packet header information onto the packet to route the packet and/or include service chain data. Consequently, OF1 (e.g., network element 202) can send the packet to OF2 (e.g., network element 204) based on the attached packet header, and then the OF2 (e.g., network element 204) can send the packet to OFk (e.g., network element 206). OFk (e.g., network element 206) can then send the packet to OF3 (e.g., network element 208). As with any transmission, prior to sending the packet the next element, the current element can remove its identification information from the packet header information by updating the packet header so that the packet progresses to the next network element. When the packet arrives at OF3, then the system can determine (based on the packet header data) which microservices are chained and routed to the destination address location 212 for the IoT device.

The SDN controller 214 can be capable of analyzing and collecting data on network utilization, and based on that information, the SDN controller 214 can adjust the routing information to adjust the packet route. For example if there is another route that is better suited for the packet to travel, then the SDN controller 214 can adjust routing data based on past, present, and/or future anticipated network utilization. Business support systems, operations support systems, and/or open network and automation platforms can also be used to configure the SDN controller 214 via a computing device 216.

Referring now to FIG. 4, illustrated is an example schematic system block diagram of microservices for connections segment routing according to one or more embodiments. Within a service layer abstraction 400, microservices can exist to support the IoT devices. For example, a machine learning (ML) microservice 402 can utilize predictive algorithms to adjust the various microservices, make recommendations, classify users, and detect violations and anomalies. A microservice composer 404 can generating the micro services 406, 408, 410 (e.g., MS1, MS2, MSn) for use within the connectionless segment routing system.

Figure 5:
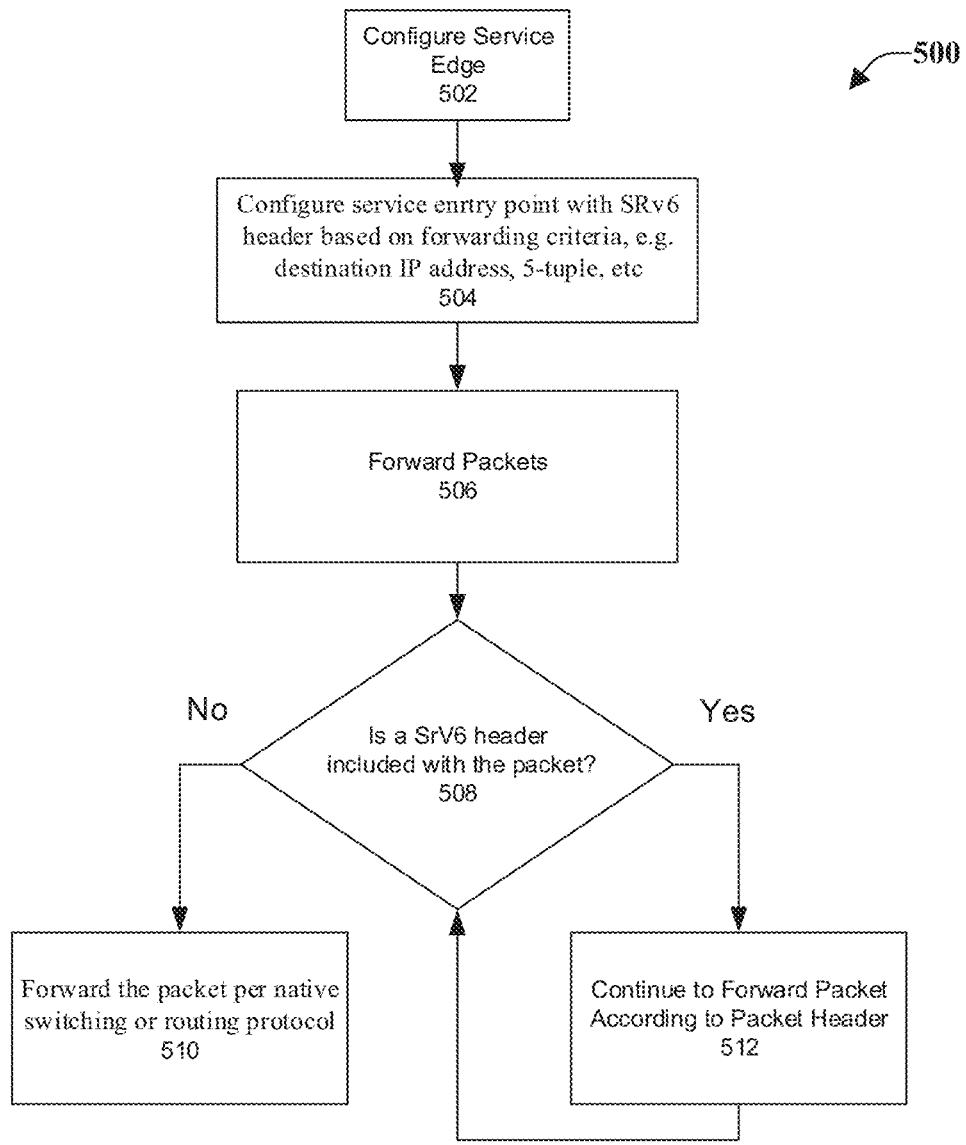
FIG. 5 illustrates an example flow diagram for connectionless segment routing according to one or more embodiments.

Referring now to FIG. 5 illustrates an example flow diagram 500 for connectionless segment routing according to one or more embodiments. At block 502 the SDN controller 214 can configure a service edge of a wireless networking system to receive packet routing and service chain data policies in the form of SRH for an IoT device or a group of IOT devices. At block 504, the SDN controller 214 can also configure a service entry point of the wireless networking system with an SRv6 header based on forwarding criteria (e.g., destination IP address, 5-tuple, etc.) to receive packet data and attach segment routing headers to the packet data to route the packet data to the service edge. The SDN controller 214 can configure the service entry point by sending a routing table to a network node 106 of the wireless networking system. Thereafter, at block 506, a network element 202, 204, 206, 208 can forward the packet data in accordance with the routing table at the network node 106. The decision block 508 can determine if an SRv6 packet header is included with the packet. If a packet header is not attached to the packet, then the final network element has removed its header information and the packet has reached its destination. Thus, the packet forwarding is ended at block 510. However, if a packet header is still included with the packet at block 508, then the most current network element 202, 204, 206, 208 can continue to forward the packet, per a native switching and/or routing protocol, to the next network element 202, 204, 206, 208 that it contains routing information for. Consequently, at block 512, the wireless networking system can recursively continue to forward the packet according to the packet headers until a packet header is not included with the packet. In which case the system can end the packet forwarding at block 510.

Figure 6:
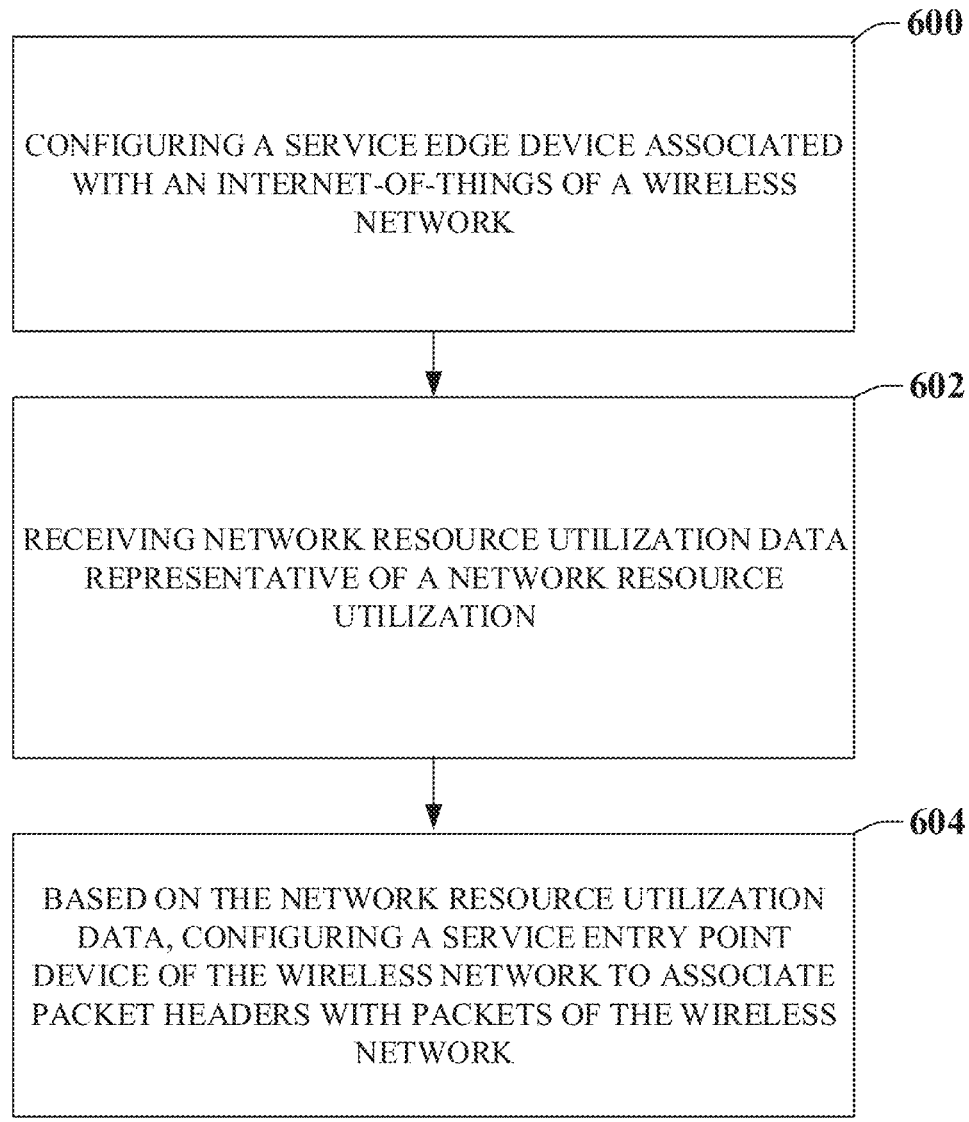
FIG. 6 illustrates an example flow diagram for method for connectionless segment routing for a 5G network according to one or more embodiments.

Referring now to FIG. 6, illustrated is an example flow diagram for method for connectionless segment routing for a 5G network according to one or more embodiments. At element 600, a method can comprise configuring (by the SDN controller 214) a service edge device (e.g., network element) associated with an internet-of-things device of a wireless network. At element 602, the method can comprise receiving (by the SDN controller 214) network resource utilization data representative of a network resource utilization and service delivery needs. Additionally, based on the network resource utilization data, at element 604, the method can comprise configuring (by the SDN controller 214) a service entry point device (e.g., network node 106) of the wireless network to associate packet headers with packets of the wireless network.

Figure 7:
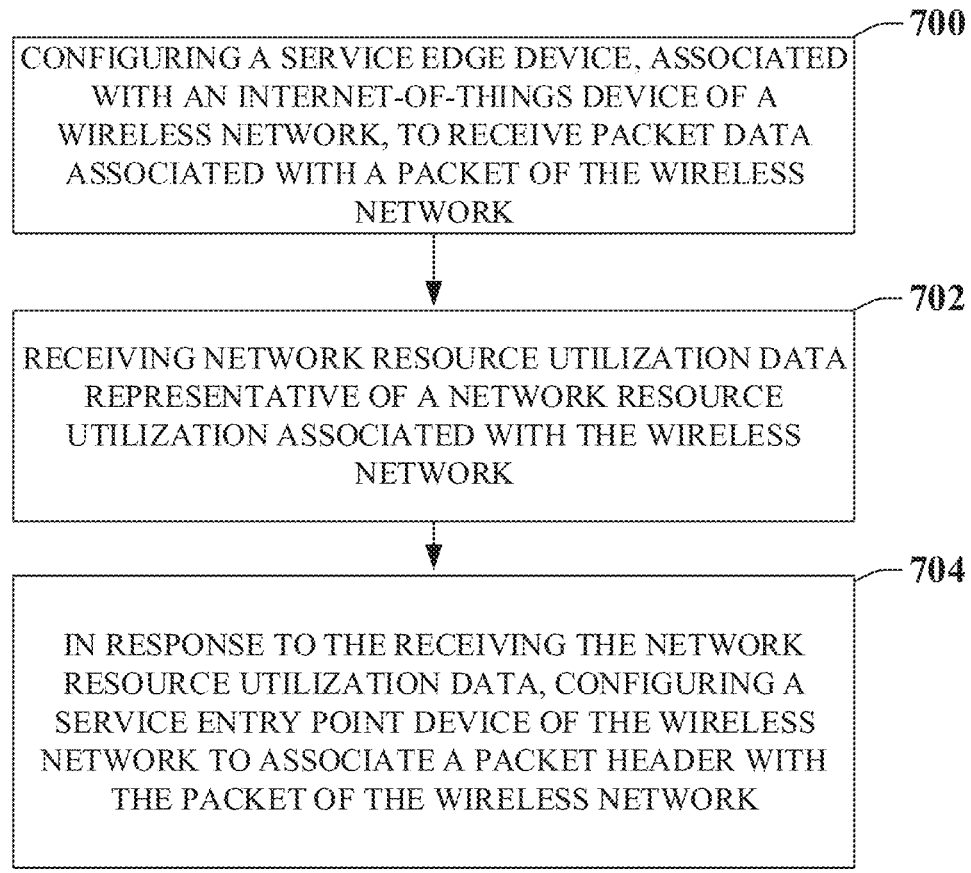
FIG. 7 illustrates an example flow diagram for system for connectionless segment routing for a 5G network according to one or more embodiments.

Referring now to FIG. 7, illustrated is an example flow diagram for system for connectionless segment routing for a 5G network according to one or more embodiments. According to another embodiment, at element 700 a system can facilitate, configuring (by the SDN controller 214) a service edge device (e.g., network element), associated with an internet-of-things of a wireless network, to receive packet data associated with a packet of the wireless network. At element 702, the system can comprise receiving (by the SDN controller 214) network resource utilization data, representative of a network resource utilization and service delivery needs associated with the wireless network. Furthermore, at element 704, in response to the receiving the network resource utilization data, the system can comprise configuring (by the SDN controller 214) a service entry point device (e.g., network node 106) of the wireless network to associate a packet header with the packet of the wireless network.

Figure 8:
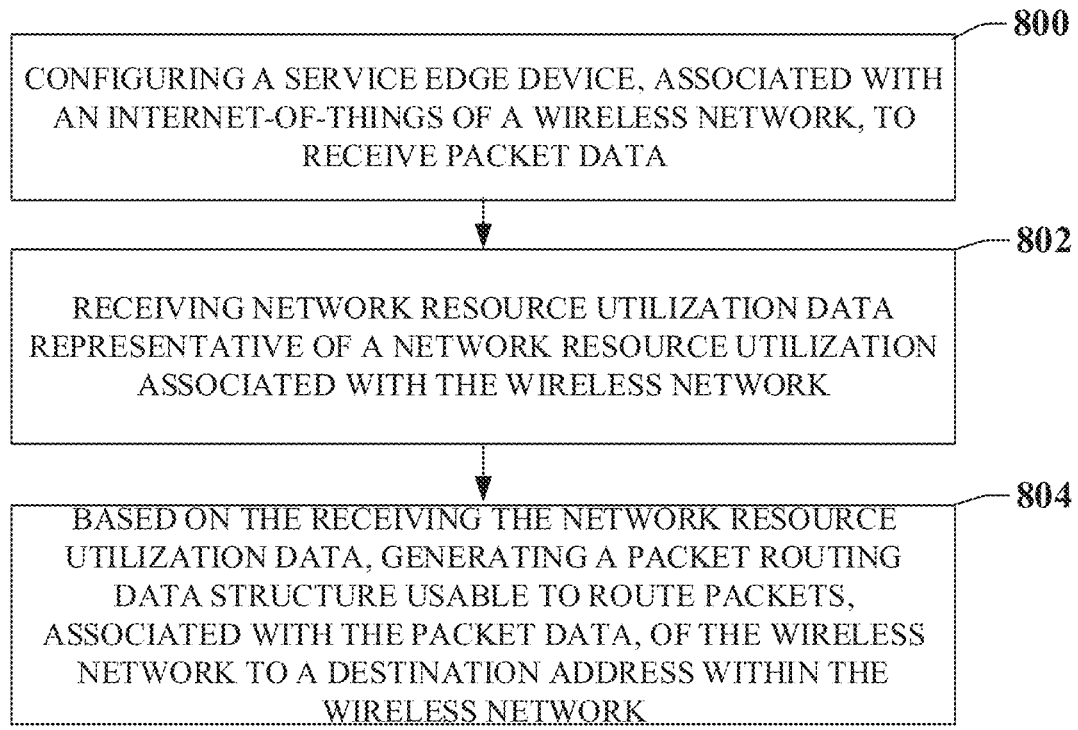
FIG. 8 illustrates an example flow diagram for machine-readable medium for connectionless segment routing for a 5G network according to one or more embodiments.

Referring now to FIG. 8, illustrated is an example flow diagram for machine-readable medium for connectionless segment routing for a 5G network according to one or more embodiments. At element 800, a machine-readable storage medium can perform the operations comprising configuring (by the SDN controller 214) a service edge device, associated with an internet-of-things of a wireless network, to receive packet data. At element 802, the machine-readable medium can perform the operations comprising receiving network resource utilization data representative of a network resource utilization associated with the wireless network. Additionally, based on the receiving the network resource utilization data, at element 804, the machine-readable medium can perform the operations comprising generating (by the SDN controller 214) a packet routing data structure usable to route packets of the wireless network to a destination address within the wireless network.

Figure 9:
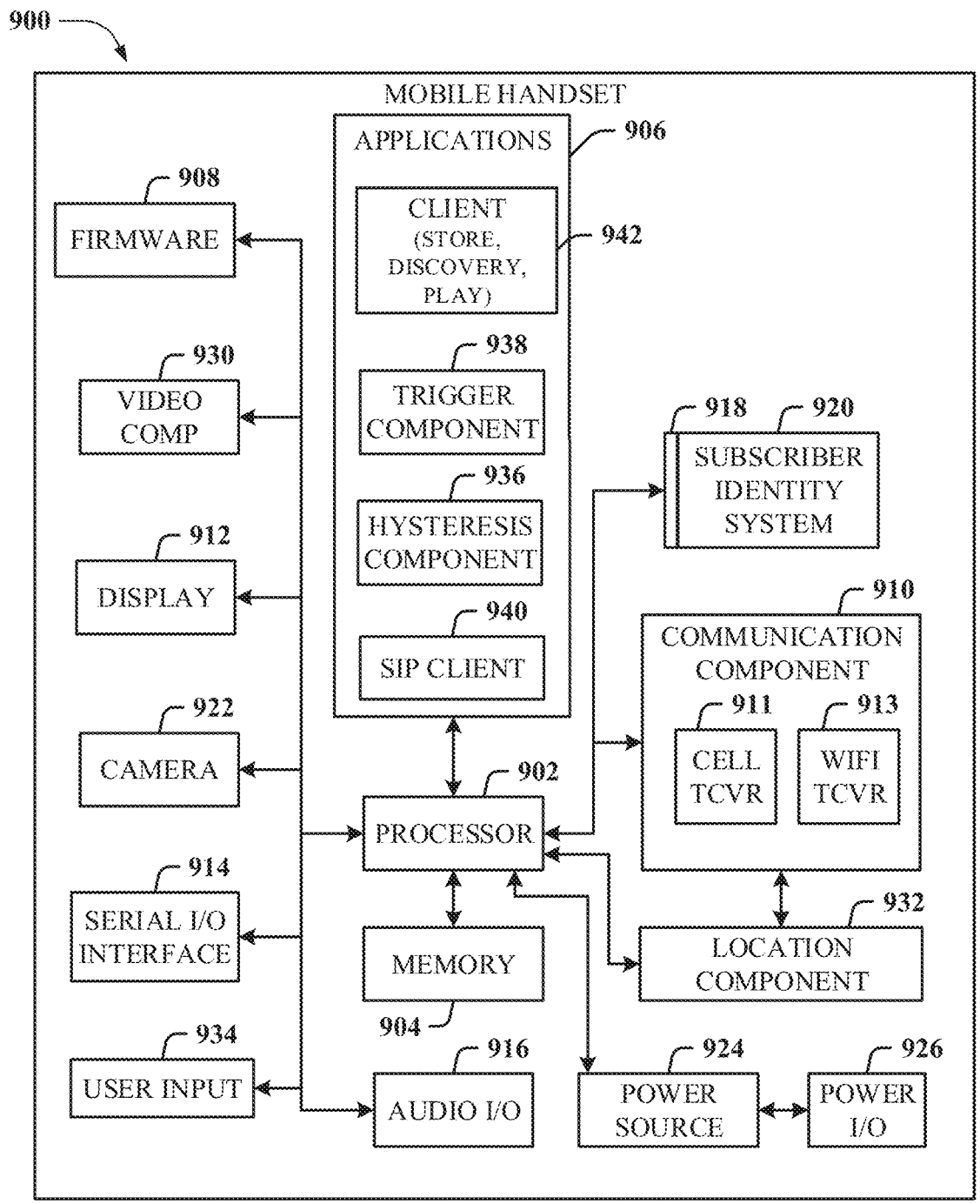
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
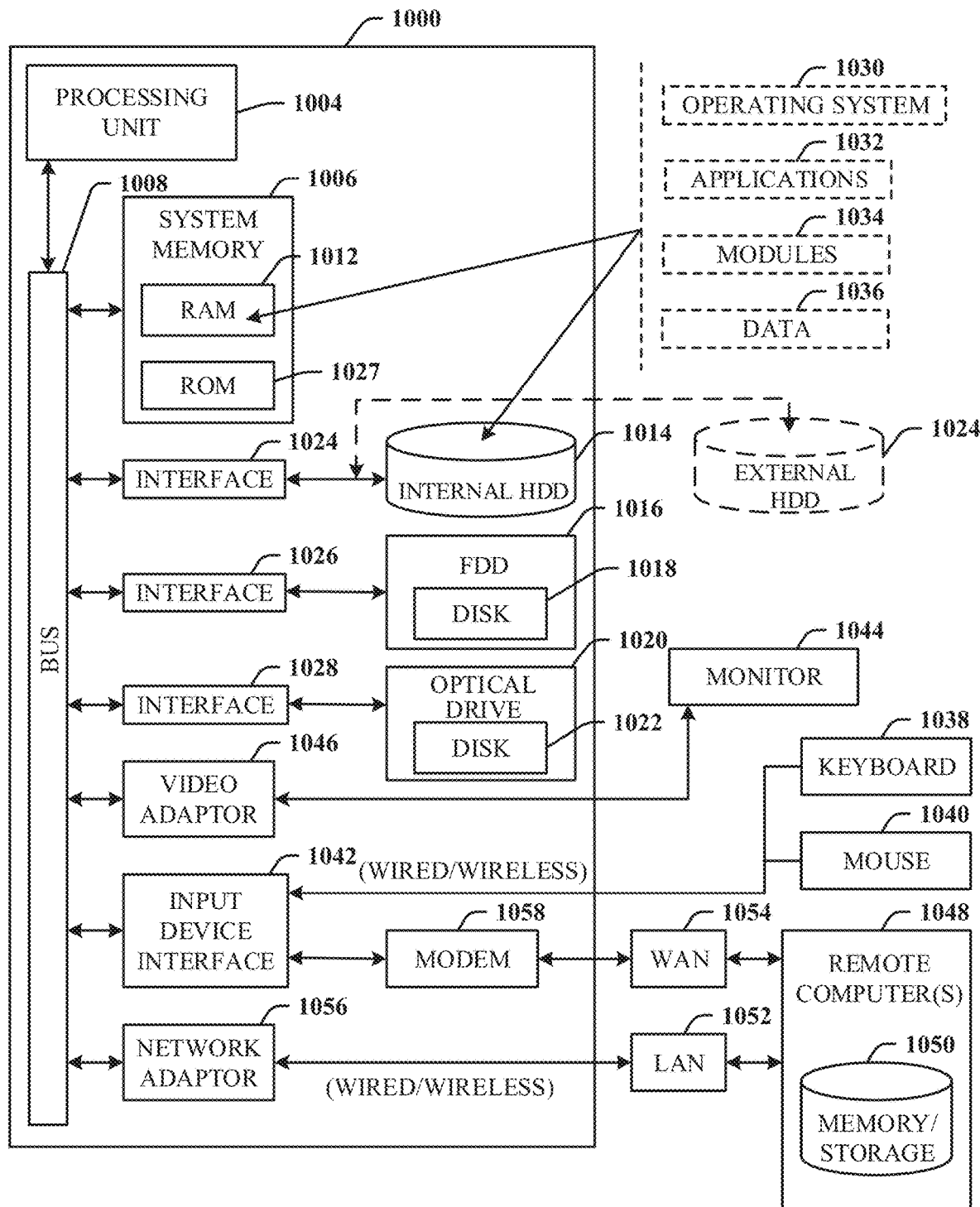
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Stationary IoTs, such as meter readers, will grow to billions in the next few years. Unlike smart devices, each of these stationary IoT generates very low revenue per user. Traditional 3GPP tunnel/bearer based connection-oriented architectures do not scale economically for billions of IoT devices due to the amount of signaling overhead associated with GTP tunnel setup/tear down and the states related to GTP tunnels maintained at various parts of the mobile network. This disclosure can facilitate the mobility network to efficiently support massive stationary and/or mobile IoTs by reducing the amount of signaling overhead, the state of the IoTs kept in network, and simplifying the data plane when possible. Thus reducing multiple states of the IoTs to a shared state.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   selecting, by a software-defined networking device comprising a processor, network equipment from a group of the network equipment to operate as service entry point network equipment associated with an internet-of-things device configured to communicate information via a network;
   receiving, by the software-defined networking device, network resource utilization data representative of a network resource utilization of the network; and
   configuring, by the software-defined networking device, based on the network resource utilization data, the service entry point network equipment to:
     associate first packet headers with first packets communicated from a connection based portion of the network to a connectionless based portion of the network, wherein a first packet header of the first packet headers comprises first routing data specifying an ordered list of network nodes in the connectionless based portion of the network usable to forward a first packet comprising the first packet header, wherein associating the first packet headers comprises generating, using a machine learning model that employs a predictive process, a microservice that classifies users and detects violations within the connectionless based portion of the network, and
     remove second packet headers from second packets communicated from the connectionless based portion of the network to the connection based portion of the network, wherein a second packet header of the second packet headers comprises second routing data associated with the connectionless based portion of the network.

2. The method of claim 1, further comprising:
   generating, by the software-defined networking device, a data structure based on the network resource utilization data, wherein the data structure comprises respective routing data to include in the first packet headers.

3. The method of claim 1, wherein respective network nodes of the ordered list of network nodes are removed from the ordered list of network nodes in the first packet header, in response to the first packet reaching the respective network nodes, and prior to the respective network nodes forwarding the first packet.

4. The method of claim 1, wherein the first packet header further comprises service chaining vector data specifying a sequence of service functions to perform with respect to a destination of the first packet.

5. The method of claim 1, wherein the network resource utilization data comprises storage data representative of a storage capacity of the service entry point network equipment.

6. The method of claim 1, wherein the connectionless based portion of the network comprises respective groups of internet-of-things devices of different types, and a group of internet-of-things devices of the respective groups comprises the internet-of-things device.

7. The method of claim 6, further comprising:
   generating, by the software-defined networking device, a data structure based on the network resource utilization data, wherein the data structure comprises respective routing data for the respective groups of internet-of-things devices.

8. A software-defined networking device, comprising:
   a processor; and
   a memory that stores executable instructions that, when executed by the processor, facilitate performance of operations, comprising:
     selecting service edge equipment from a group of the service edge equipment to operate as service entry point edge equipment associated with an internet-of-things equipment configured to communicate via a network;
     receiving network resource utilization data representative of a network resource utilization associated with the network;
     configuring, based on the network resource utilization data, the service entry point edge equipment to:
       associate first packet headers with first packet communicated from a connection based portion of the network to a connectionless based portion of the network, wherein a first packet header of the first packet headers comprises first routing data specifying an order of network nodes in the connectionless based portion of the network applicable to forwarding a first packet comprising the first packet header, wherein associating the first packet headers comprises generating, using a machine learning model that employs a predictive process, a group of microservices that performs user classification and detects violations within the connectionless based portion of the network, and remove second packet headers from second packets communicated from the connectionless based portion of the network to the connection based portion of the network, wherein a second packet header of the second packet headers comprises second routing data associated with the connectionless based portion of the network.

9. The software-defined network device of claim 8, wherein configuring the service entry point edge equipment comprises sending, to the service entry point edge equipment, a data structure, and wherein the data structure comprises respective routing data for inclusion in the first packet header.

10. The software-defined network device of claim 8, wherein connection based portion of the network employs a general packet radio service tunneling protocol.

11. The software-defined network device of claim 8, wherein respective network nodes of the order of network nodes are removed from the order of network nodes in the first packet header, in response to the first packet reaching the respective network nodes, and prior to the respective network nodes forwarding the first packet.

12. The software-defined network device of claim 8, wherein the first packet header further comprises service chaining vector data defining a sequence of microservices to perform with respect to a destination of the first packet.

13. The software-defined network device of claim 8, wherein the connectionless based portion of the network comprises respective groups of internet-of-things devices of different types, and a group of internet-of-things devices of the respective groups comprises the internet-of-things device.

14. The software-defined network device of claim 8, wherein the operations further comprise generating a data structure based on the network resource utilization data, and wherein the data structure comprises respective routing data for the respective groups of internet-of-things devices.

15. A non-transitory machine-readable medium, comprising executable instructions that, when executed by a processor of network equipment, facilitate performance of operations, comprising:

configuring a service edge device from a group of the network equipment to operate as a service entry point device associated with internet-of-things devices configured to communicate via a network;

receiving network resource utilization data representative of a network resource utilization associated with the network;

configuring, based on the network resource utilization data, the service entry point device to:

associated first packet headers with first packets sent from a connection based portion of the network to a connectionless based portion of the network, wherein a first packet header of the first packet headers comprises first routing data specifying a sequence of network nodes in the connectionless based portion of the network for forwarding a first packet comprising the first packet header, wherein associating the first packet headers comprises generating, using a machine learning model that employs a predictive process, a microservice that classifies user identities and detects violations within the connectionless based portion of the network, and remove second packet headers from second packets communicated from the connectionless based portion of the network to the connection based portion of the network, wherein a second packet header of the second packet headers comprises second routing data associated with the connectionless based portion of the network.

16. The non-transitory machine-readable medium of claim 15, wherein respective network nodes of the sequence of network nodes are removed from the sequence of network nodes in the first packet header, in response to the first packet reaching the respective network nodes, and prior to the respective network nodes forwarding the first packet.

17. The non-transitory machine-readable medium of claim 15, wherein the first packet header further comprises service chaining vector data defining a sequence of virtual network functions for a last network node of the sequence of network nodes to perform with respect to a destination of the first packet.

18. The non-transitory machine-readable medium of claim 15, wherein the connectionless based portion of the network comprises respective groups of internet-of-things devices of different types from the internet-of-things devices.

19. The non-transitory machine-readable medium of claim 18, wherein the operations further comprise generating a data structure based on the network resource utilization data, and wherein the data structure comprises respective routing data for the respective groups of internet-of-things devices.

20. The non-transitory machine-readable medium of claim 15, wherein the connection based portion of the network employs a tunneling protocol.

* * * * *